United States Patent [19]

Williams

[11] Patent Number: 4,970,464
[45] Date of Patent: Nov. 13, 1990

[54] LINEAR POSITION-DISPLACEMENT MAGNETOSTRICTIVE TRANSDUCER HAVING MULTIPLE CYLINDRICAL ELECTROMAGNETS FOR GENERATING FLUX, EACH ELECTROMAGNET HAVING A CENTERED PASSAGEWAY FOR RELATIVE TRAVEL ALONG THE SAME MAGNETOSTRICTIVE WAVEGUIDE

[76] Inventor: Jack Williams, 510 N. Yakima, Tacoma, Wash. 98403

[21] Appl. No.: 407,357

[22] Filed: Sep. 14, 1989

[51] Int. Cl.$^5$ .................... G01B 7/14; H04R 15/00
[52] U.S. Cl. .................. 324/207.13; 324/207.22; 324/207.23; 367/121; 367/156
[58] Field of Search .................. 324/207.13, 207.14, 324/207.15, 207.16, 209, 207.22, 260–263; 367/96, 99, 117, 118, 120, 121, 153, 156

[56] References Cited

U.S. PATENT DOCUMENTS

| | | | |
|---|---|---|---|
| 4,028,619 | 6/1977 | Edwards | 324/207.13 |
| 4,238,844 | 12/1980 | Ueda et al. | 367/117 |
| 4,319,189 | 3/1982 | Cullum, Jr. et al. | 324/207.13 |
| 4,654,590 | 3/1987 | Kitaura et al. | 324/207.13 |
| 4,678,993 | 7/1987 | Vinnemann | 324/207.13 |

Primary Examiner—Gerard R. Strecker
Assistant Examiner—Warren S. Edmonds
Attorney, Agent, or Firm—Roy E. Mattern, Jr.

[57] ABSTRACT

When observing or setting changeable positions of respective movable components of a machine, such as movable saws of a multiple cut sawing machine, each linear position-displacement transducer used has the wave guide housing thereof, made of sufficient length to receive, instead of one permanent magnet, several overall cylindrical electromagnets serving as flux generators. Each electromagnet: has a centered hole, to permit the movement thereof along the wave guide; and has four electromagnets equally radially spaced in a radial plane, with their commonly positioned north poles, forming an overall central north pole, surrounding the center hole, which is formed by a non ferrous tube, and with their radially spaced south poles being adjacent to an encircling soft iron band. This band serves as a 360 degree target for flux radiating from the overall central north pole, and as a heat sink, thereby strengthening and enhancing the radiation signal pattern bombarding the wave guide housing, when the overall cylindrical electromagnet is being energized to serve in determining the location of the machinery component to which it is attached.

8 Claims, 2 Drawing Sheets

U.S. Patent    Nov. 13, 1990    Sheet 1 of 2    4,970,464
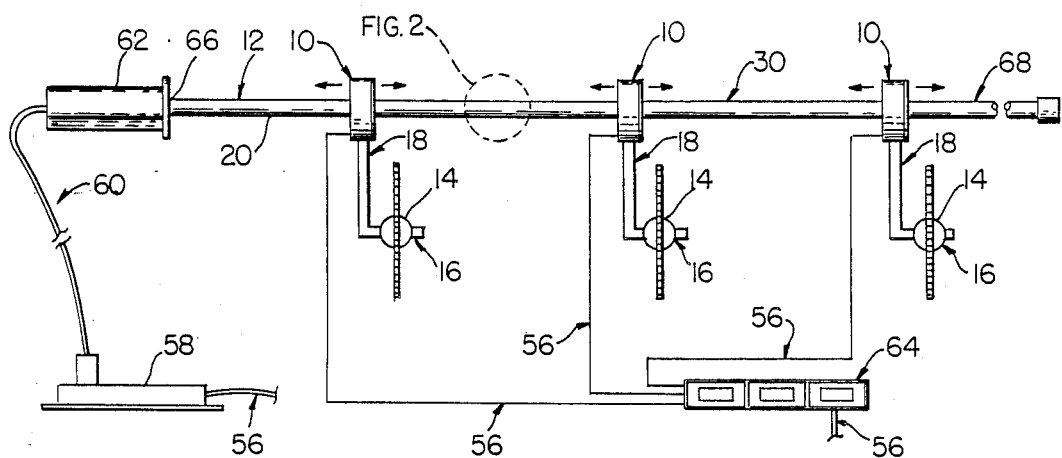
FIG. 1
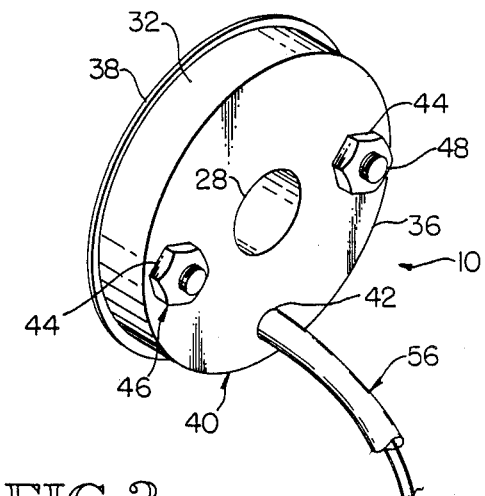
FIG. 2
FIG. 3

LINEAR POSITION-DISPLACEMENT MAGNETOSTRICTIVE TRANSDUCER HAVING MULTIPLE CYLINDRICAL ELECTROMAGNETS FOR GENERATING FLUX, EACH ELECTROMAGNET HAVING A CENTERED PASSAGEWAY FOR RELATIVE TRAVEL ALONG THE SAME MAGNETOSTRICTIVE WAVEGUIDE

BACKGROUND

When the accurate positioning of changeable positions of machine components, such as multiple saws of a cutting machine, is to be undertaken and thereafter periodically observed until intentionally changed again, absolute linear position-displacement transducer systems are used. Each transducer has an external magnet, which is connected to a machine component, and when this machine component is moved, this external magnet moves along the wave guide, i.e. probe, of this transducer. For each machine component a separate transducer is used.

In respect to determining portions of movable components, in 1980 Messrs. Ueda and Noguchi in their U.S. Pat. No. 4,238,844, illustrated and discussed their displaced position detecting device. They determined the changed position of a component travelling or stopping between two fixed locations. A magnetostrictive wire extended between the two fixed locations, and the travelling component had an exciting means to generate an ultrasonic signal in the magnetostrictive wire, which was received in respective means located at each respective end of the magnetostrictive wire.

In 1982, Messrs Cullum, Thompson, and Worthington, in their U.S. Pat. No. 4,319,189 disclosed their magneto-acoustic position sensor, employing pulse code sequence generators and detectors and using a magnetostrictive wire. A position signalling electromagnetic drive head, could be moved with a machine component, and also moved along the magnetostrictive wire. When electrically pulsed, this drive head produced pulses which were received by detectors and analyzed to determine the position of the machine component.

In 1987 Messrs. Kataura and Ito in their U.S. Pat. No. 4,654,590, illustrated and described their method and apparatus for detecting the position of a movable object utilizing the magnetostrictive effect to generate ultrasonic waves. They placed several permanent magnets at equal spacings along a movable member, the position of which was to be determined from time to time. Then they used two permanent magnets spaced apart at a predetermined distance from each other and from the detection portion of a wave guide located alongside the movable member. When the wave guide system was energized, the magnetostrictive ultrasonic waves generated on the wave guide were detected at the positions of these permanent magnets, and the position of the movable member was detected from the number of ultrasonic wave signals and the propagation time.

Also in 1987, Messrs. Vennemann and Koninger in their U.S. Pat. No. 4,678,993, disclosed their distance measuring device operating with torsional ultrasonic waves detected without mode conversion. A permanent magnet moving in like relationship to a movable member, then moved along a tube of magnetostrictive material. When electrical pulses were produced by a pulse generator and these pulses travelled along the tube, then at the location of the permanent magnet torsional ultrasonic pulses were generated, and they served as position signals indicating the location of the movable member.

Although there have been many successful products, apparatuses, and methods, utilized by others, centering on the utilization of signal generation apparatus built around a tube made of magnetostrictive material, which experiences a local rotary strain where two magnetic fields interact, there remained a need to provide overall equipment at lower costs, when more movable members of machinery had to be controlled and/or monitored.

SUMMARY

When several movable members of a machine, or of machines along a production line are to be monitored in respect to knowing their respective positions at designated time periods, then one or more absolute linear position-displacement transducer systems are used. Each one has the position sensing capability thereof expanded by using multiple cylindrical electromagnets in place of one permanent magnet.

Whereas the flux being generated by a permanent magnet can never be turned off, each of the multiple cylindrical electromagnets arranged along the wave guide is not generating flux until it is energized. Then, when a respective position of a respective movable member of a machine is to be determined, its associated cylindrical electromagnet is energized.

To create a highly efficient and very adequate radiating flux signal pattern at each cylindrical electromagnet, when it is energized, to adequately bombard the wave guide energy, or the so called probe energy, emanating from the selected absolute linear position-displacement transducer, each one of the multiple cylindrical electromagnets is preferably made as follows:

Four individual electromagnets are equally radially spaced in a radial plane, with their almost commonly positioned north poles, forming an overall central north pole of the overall cylindrical electromagnet. These four north poles surround a centered non ferrous tube, which accommodates the wave guide, often referred to as the probe. Their radially spaced south poles are adjacent to an encircling soft iron band. This band serves as a 360 degree target for flux radiating from the overall central north pole, thereby strengthening and enhancing the radiation signal pattern bombarding the wave guide housing, when the overall cylindrical electromagnet is being energized to serve in determining the location of the machinery component to which it is attached. Also heat being generated within the overall cylindrical electromagnet is transferred to and dissipated through this encircling soft iron band as it serves as a heat sink.

These individual electromagnets and their connecting circuitry are kept in position by filling adjacent spaces with epoxy. Top and bottom plastic laminate covers are used with respective top and bottom O ring seals to complete a dust and moisture free assembly. This assembly is held together by using non-ferrous support posts together with respective fasteners, to complete the assembly of each overall cylindrical electromagnet, for movement thereof, along the wave guide of an absolute linear position-displacement transducer system.

DRAWINGS

The drawings illustrate how these cylindrical electromagnets are used and how they are made in the figures described as follows:

FIG. 1 is a schematic planar view of an absolute linear position-displacement transducer system functioning with three cylindrical electromagnets, which in turn are connectable to three movable power saws of a sawing machine;

FIG. 2 is a partial section of the wave guide overall structure of the absolute linear position-displacement transducer, showing the circuitry that carries the current pulses, the magnetostrictive alloy tube, and the surrounding protective and structural stainless steel tube;

FIG. 3 is a perspective view of an individual cylindrical electromagnet;

DESCRIPTION OF A PREFERRED EMBODIMENT

Figure 4:
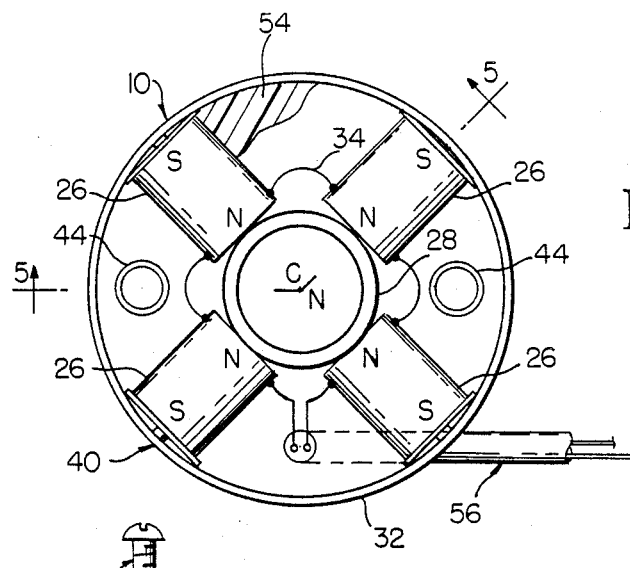
FIG. 4 is a side view of the inside arrangement of an individual cylindrical electromagnet, after an outside cover has been removed, and showing, only in part, the epoxy used to fill the voids.
Figure 5:
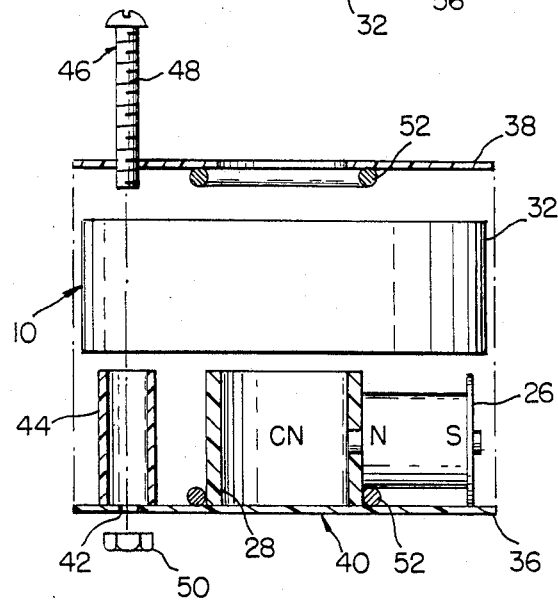
FIG. 5 is an exploded view, with some portions removed and some portions shown in section, to illustrate the preassembly positions of components of an individual electromagnet.

In the drawings a preferred embodiment of the cylindrical electromagnet 10 is illustrated in FIG. 1, as it is utilized with other like cylindrical electromagnets 10 and an absolute linear position-displacement transducer 12, to alternatively determine the changeable position of a movable member 14, i.e. a power saw 14, of an overall assembly 16, i.e. a sawing machine 16. There are multiple combinations 18 of respective power saws 14 and respective cylindrical electromagnets 10 functionally arranged with this one absolute linear position-displacement transducer 12.

These multiple cylindrical electromagnets 10, are used in place of a single permanent magnet, not shown, which is generally furnished with each absolute linear positioned-displacement transducer 12. Such an available transducer 12 is marketed under the trademark "Temposonics" by the MTS Systems Corporation. They are described as follows:

By precisely sensing the position of an external permanent magnet, these "Temposonics" solid-state transducers are able to measure linear displacements with infinite resolution. Since there is no contact between the permanent magnet and the sensor rod, acting as a wave guide, there is no wear, friction, or degradation of accuracy. The respective outputs represent an absolute position, rather than an incremental indication of a position change of a movable member of an overall assembly. There is an option of obtaining one of these absolute linear position-displacement transducers having either a digital or an analog readable output.

The position measurements are obtainable by using a "Temposonic" transducer, when a current pulse is sent through a wire, which has been threaded through a tube made of a magnetostrictive alloy and returned outside of this tube. When the current is flowing through this wire a resulting magnetic field is concentrated in this tube, which is then performing as a wave guide.

When a doughnut shaped permanent magnet of this "Temposonic" transducer is passed over this tube, then serving as a wave guide, the tube made of this magnetostructure material experiences a local rotary strain, where these magnetic fields interact with one another. This strain continues for the duration of the electrical pulse occurring in the wave guide. The rotary strain pulse travels along the tube, serving as the wave guide, at ultrasonic speed. Then this rotary strain pulse is detected at the end of the tube. By measuring the time between the generation of the initial electrical pulse, and detection of the ultrasonic rotary strain pulse arriving at the end of the tube, the distance of the external permanent magnet from a reference point is determined. This "Temposonic" transducer is so employed to determine the position of one movable member of an overall assembly.

In specific reference one "Temposonic" transducer, a twenty two mil diameter hollow tube having a two to three mil wall serves as the wave guide, when an insulated wire is threaded through it and then extended back alongside it, and this tube and wire assembly is receiving a sonic pulse. The tube is made of a magnetostrictive alloy having a modulus of elasticity, which is largely independent of temperature and aging effects. The velocity of each sonic pulse is a function of the modulus of elasticity and density of the tube of the wave guide. The tube and insulated wire are mounted, under tension, in a three eighths inch diameter stainless steel tube. Damping materials are clamped around the ends of the tubes to absorb the sonic pulses, and to prevent reflections from the wave guide terminations of this "Temposonic" absolute linear position-displacement transducer 12.

In place of the doughnut shaped permanent magnet of the "Temposonic" transducer or like functioning transducer, a group of cylindrical electromagnets 10 are movably arranged over the stainless tube 20, in which a magnetostrictive alloy tube 22 and an insulated wire 24 are positioned. Each cylindrical electromagnet 10 is also doughnut shaped, and each one is constructed as follows:

Four individual electromagnets 26 are equally radially spaced in a radial plane, with their almost commonly positioned north poles N, forming an overall central north pole CN of the overall cylindrical electromagnet 10. A centered non ferrous tube 28 to accommodate the stainless tube 20 of the wave guide assembly 30 is positioned between all the north poles N of the four individual electromagnets 26. An encircling soft iron band 32, or ring 32, is positioned adjacent to the four individual electromagnets 26, at the south poles S thereof, to serve as a 360 degree target for flux radiating from the overall central north pole CN. Such service as a target strengthens and enhances a radiation signal pattern which is bombarding the wave guide tube 22, i.e. the magnetostrictive tube 22. This bombarding is occurring when the overall cylindrical electromagnet 10 is being energized, and also while the linear position-displacement transducer 12 is likewise being energized, to serve in determining the location of a movable member 14 of an overall assembly 16 to which it is related.

This arrangement of the four individual electromagnets 26 within the soft iron band 32 reduces the physical size requirements of the overall cylindrical electromagnet 10, and lowers the electrical current requirements. Also this arrangement establishes the soft iron band 32 as an effective heat sink to disperse the heat generated by the four individual electromagnets 26.

Electrical circuitry 34 serves to receive electrical energy and distribute this electrical energy to the four individual electromagnets 26.

Non conductive covers 36, 38 are interfitted with the encircling soft iron band 32 and the centered non ferrous tube 28 to form a housing 40 about the four individual electromagnets 26, and portions of the electrical circuitry. An access hole 42 is provided in non conductive cover 36 through which a portion of the electrical circuitry 34 passes. Preferably, non-ferrous support posts 44 and fastener assemblies 46 of a bolt 48 and nut 50 are used to join together the non conductive covers 36 and 38. In addition, O rings 52 are preferably employed to keep dust and moisture out of the overall cylindrical electromagnet 10. Then preferably all the interior otherwise open spaces are filled with an epoxy 54, whereby when the assembly is completed of the overall cylindrical electromagnet 10, the components thereof are firmly held together in a dust free and moisture free configuration of an overall comparatively small size.

When the position or positions, of one or more movable members 14, such as saws 14, of an overall assembly 16, such as a sawing machine 16, is or are to be determined, power from an electrical power circuit 56 is distributed via a control console 58 of the linear position-displacement transducer 12, via a distribution circuit 60, to a pulse generator 62 located at the stainless outer tube 20 containing the wave guide tube 22, thereby activating the wave guide assembly of the tube 22 and insulated wire 24. Then in reference to a particular movable member 14, power from an electrical power circuit 56 is selectively distributed via a multiple switching unit 64 to the respective electrical circuitry 34 of the selected overall cylindrical electromagnet 10.

At this operational time, the magnetostructure material experiences a local rotary strain, where the magnetic fields of the cylindrical electromagnet 10 and the wave guide, within the magnetostructure tube 22, interact with one another. Then this rotary strain pulse travels to be detected at the end of the tube 22. Thereafter, by measuring the time between the generation of the initial electrical pulse and the detection of the ultrasonic rotary strain pulse arriving at the end of the tube, the distance of the cylindrical electromagnet 20 from a reference point 66 is determined and read at the control console 58 of the linear position-displacement transducer 12.

After this location of a movable member 14 is determined, the energy supplied to this cylindrical electromagnet 10, is stopped at the multiple switching unit 64. Then, if desired, the electrical energy supply is directed, via the multiple switching unit 64, to another cylindrical electromagnet 10 to determine the position of its associated movable member 14. Following these operational procedures, the same linear position-displacement transducer 12 is effectively, alternately, and quickly, used, via several cylindrical electromagnets 10, to determine the positions of a like number of movable members 14 of an overall assembly 16. This overall arrangement 68, i.e. the overall combination 68 of these cylindrical electromagnets 10 and the one linear position-displacement transducer 12, extends the important usefulness of this transducer 12 at a comparatively much lower cost, than when using one permanent magnet with each linear position-displacement transducer 12. Moreover, this overall arrangement 68, when compared to its permanent magnet counterpart, which requires a costly linear position-displacement transducer 12 for each such permanent magnet, in contrast to the number of the cylindrical electromagnets 10 which may be mounted on a single transducer 12, will benefit the user in other substantial savings. For example, other advantages realized by using a single transducer are: reduced space requirements; fewer installation mountings; and shorter installation and start-up time. The overall savings to the user may be as much as fifty percent or more, dependent on the number of cylindrical electromagnets 10 which are used on one linear position-displacement transducer 12. Also the use of only one transducer 12 with its complement of cylindrical electromagnets 10 provides more accuracy in measurements and simplifies measurements of distances between those machinery parts 14 selected for measurement.

I claim:

1. A cylindrical electromagnet movable, along with other like cylindrical electromagnets, relative to a wave guide housing of a linear position-displacement transducer, and connectable to a movable member of an overall assembly, to receive electrical energy at selected times to generate flux used in determining the position of the movable member thereof, while the other like cylindrical electromagnets are not receiving electrical energy, thereby alternatively utilizing the linear position-displacement transducer to function with several cylindrical electromagnets to determine the relative positions of other movable members of an overall assembly, comprising:

(a) four individual electromagnets equally radially spaced in a radial plane, with their almost commonly positioned north poles, forming an overall central north pole of the overall cylindrical electromagnet;

(b) a centered non-ferrous tube to accommodate a wave guide, and positioned between all the north poles of the four individual electromagnets;

(c) an encircling soft iron band positioned adjacent to the four individual electromagnets, at the south poles thereof, to serve as a 360 degree target for flux radiating from the overall central north pole, thereby strengthening and enhancing a radiation signal pattern bombarding the wave guide housing, when the overall cylindrical electromagnet is being energized to serve in determining the location of the movable member of an overall assembly to which it has been connected, and also while the linear position-displacement transducer is likewise being energized;

(d) non conductive covers interfitting with the encircling soft iron band and the centered non ferrous tube to form a housing about the four individual electromagnets; and (e) circuitry for receiving electrical energy and distributing this electrical energy to the four individual electromagnets.

2. A cylindrical electromagnet, as claimed in claim 1, having non-ferrous support posts and fasteners therefore used in holding the components together by joining the non conductive covers together.

3. A cylindrical electromagnet, as claimed in claim 1, having O ring seals placed to keep the interior four individual electromagnets free of dust and moisture.

4. A cylindrical electromagnet, as claimed in claim 2, having O ring seals placed to keep the interior four individual electromagnets free of dust and moisture.

5. A cylindrical electromagnet, as claimed in claim 1, having epoxy materials filling in any voids existing between the four individual electromagnets, the circuitry, the centered non ferrous tube, and the non conductive covers.

6. A cylindrical electromagnet, as claimed in claim 2, having epoxy materials filling in any voids existing between the four individual electromagnets, the circuitry, the centered non-ferrous tube, the non-ferrous support posts and the non-conductive covers.

7. The cylindrical electromagnet, as claimed in claim 1, in combination with a linear position-displacement transducer, and with other like cylindrical electromagnets, whereby when the linear position-displacement transducer is energized, then a selected cylindrical electromagnet of a selected movable member is energized to determine the current position of the selected movable member, thereafter the first selected cylindrical electromagnet is no longer energized and another cylindrical electromagnet is energized to determine the current position of the other selected movable member, and thereafter, alternatively, effectively, and quickly making other like determinations of other current positions of other movable members.

8. The cylindrical electromagnets in combination with the linear position-displacement transducer, as claimed in claim 7, wherein a control console of the linear position-displacement transducer and a multiple switching unit associated with the cylindrical electromagnets are jointly operated to alternatively, effectively, and quickly make respective determinations of the current positions of movable members of an overall assembly.

* * * * *